March 6, 1934.　　B. V. E. NORDBERG　　1,949,577

DIESEL ENGINE

Original Filed June 15, 1931　　4 Sheets-Sheet 1

Inventor

Bruno V. E. Nordberg

By

Attorneys

March 6, 1934.  B. V. E. NORDBERG  1,949,577
DIESEL ENGINE
Original Filed June 15, 1931   4 Sheets-Sheet 2

Inventor
Bruno V. E. Nordberg
By
Dodge and Son
Attorneys

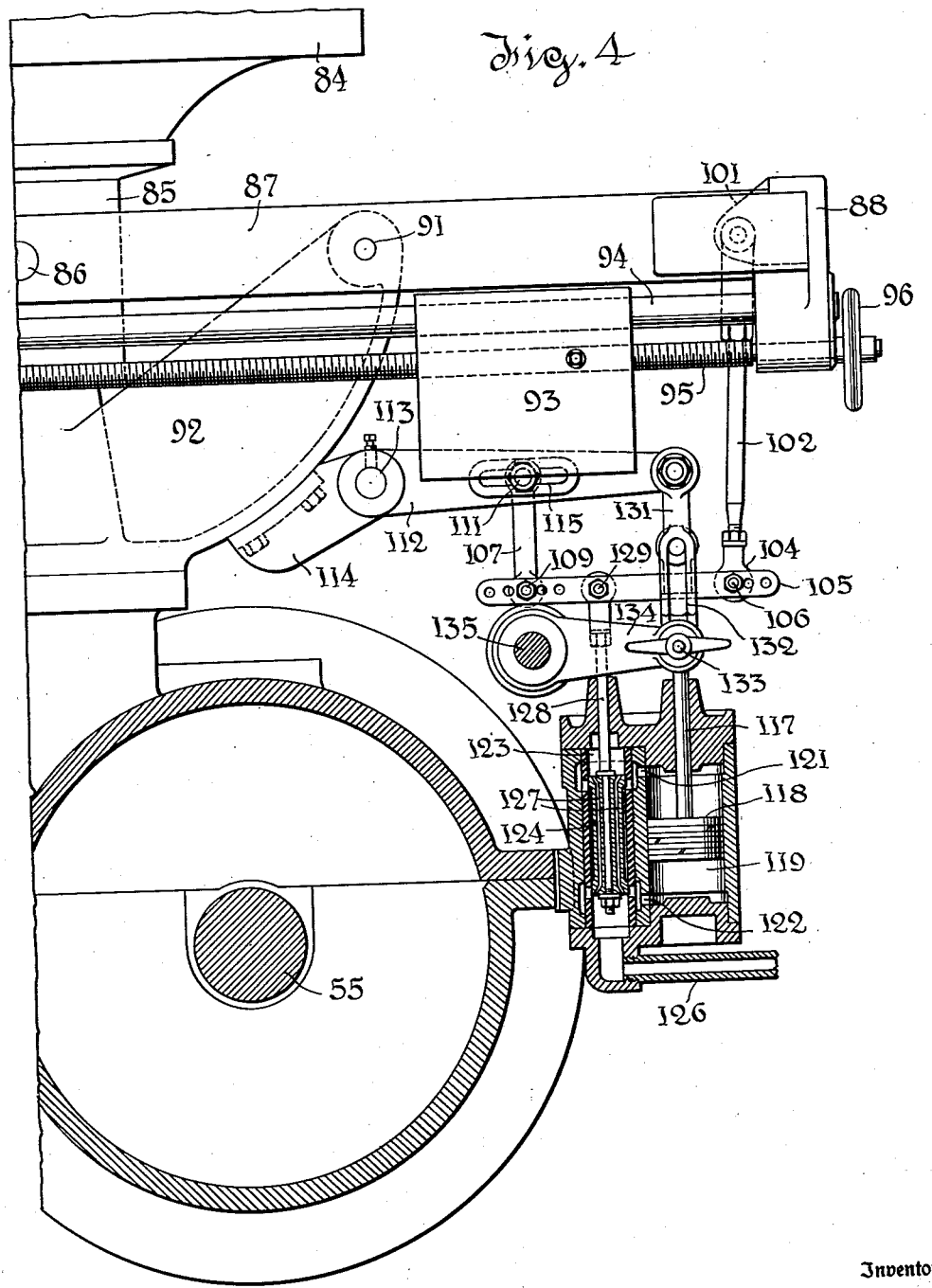

March 6, 1934.       B. V. E. NORDBERG       1,949,577
DIESEL ENGINE
Original Filed June 15, 1931    4 Sheets-Sheet 4
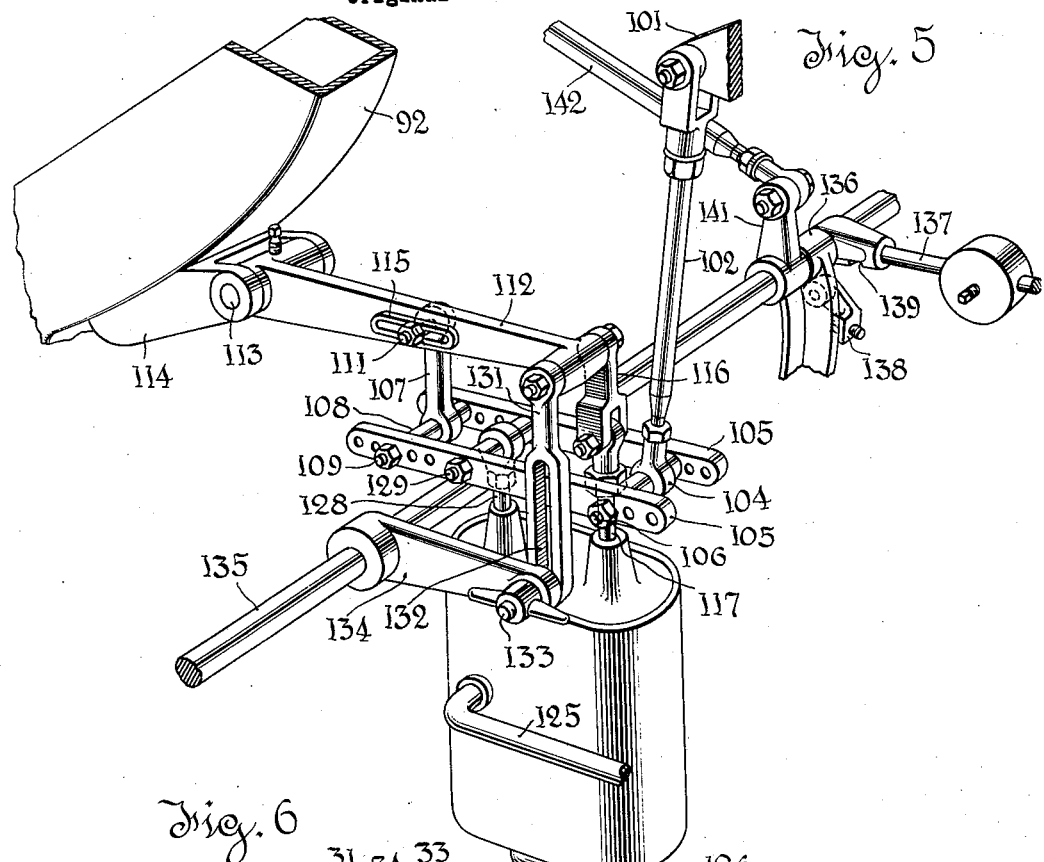
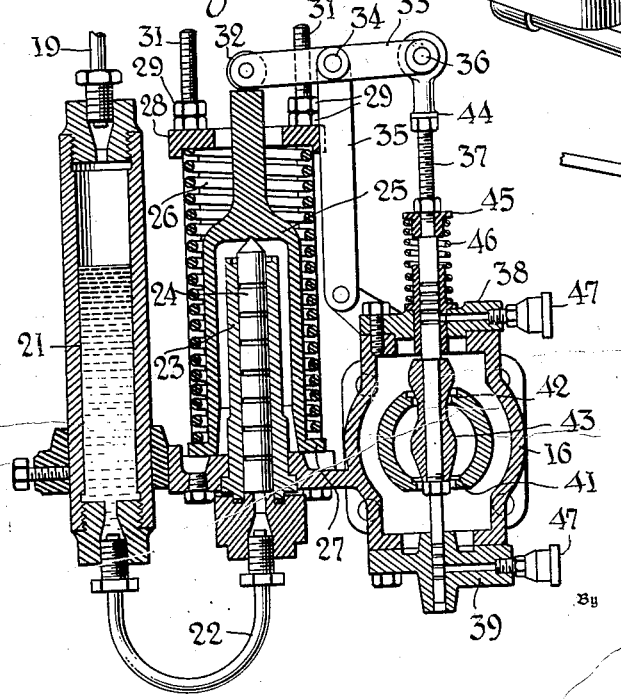
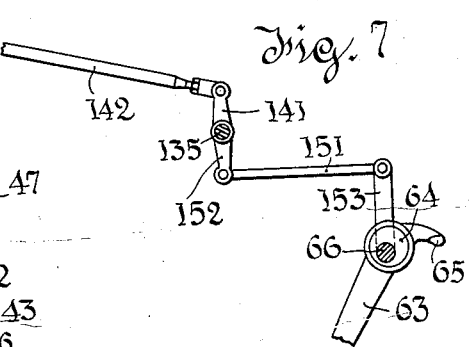
Inventor
Bruno V. E. Nordberg
Attorneys Patented Mar. 6, 1934

1,949,577

UNITED STATES PATENT OFFICE

1,949,577

DIESEL ENGINE

Bruno V. E. Nordberg, Milwaukee, Wis., assignor to Nordberg Manufacturing Company, Milwaukee, Wis., a corporation of Wisconsin Original application June 15, 1931, Serial No. 544,527. Divided and this application April 3, 1933, Serial No. 664,278

17 Claims. (Cl. 123—33)

This invention relates to Diesel engines, and particularly to the control of Diesel engines of the type described and claimed in my prior application Serial No. 342,442, filed February 25, 1929, which has since issued as Patent 1,857,256, May 10, 1932.

In that prior application was described a method of operating a Diesel engine of the air injection type using a combustible gas under pressure to inject the oil in lieu of the air customarily used.

The present application is a division of application Serial No. 544,527, filed June 15, 1931, and is directed to the apparatus. Claims to the method are presented in the parent application above identified.

There is a demand for an engine operating on the Diesel cycle and using either natural or manufactured gas as its fuel, but efforts to provide such an engine have heretofore been unsuccessful for the reason that such gases are less combustible than the fuel oils customarily used so that spontaneous ignition is sluggish particularly if the engine be at all leaky or if the cylinder walls be cold.

According to the invention of the prior application Serial No. 342,442, above identified, sufficient fuel oil was furnished to serve as an igniting fuel and this oil was injected by combustible gas compressed in the same compressor used for compressing air in the air injection Diesel engine. The gas thus serves as the primary fuel and is ignited upon the ignition of the more readily combustible oil.

The purpose in substituting gas for oil is economy in those cases where gas is available more cheaply than oil. For this reason the usual practice would be to use the minimum quantity of oil which will secure a proper ignition of the gas and to maintain this quantity uniform under all load conditions. The quantity of oil injected under no-load conditions is necessarily less than sufficient to operate the engine at no-load, for the reason that some gas must be used to inject the oil and this gas being combustible necessarily furnishes energy to the engine. If this condition be met it is possible to vary the supply of oil as well as the supply of gas in controlling the engine, but as a rule it is simpler and more economical to maintain the rate of supply of oil constant and as low as certain operation will permit.

The invention will now be described from the apparatus standpoint with reference to the accompanying drawings, in which,—

Fig. 4 is an enlarged fragmentary view, partly in section and partly in elevation, showing the servo-motor mechanism forming part of the governor.

Fig. 5 is a perspective view of the servo-motor mechanism and its connections.

Fig. 6 is a vertical axial section through the gas pressure regulator mechanism.

Fig. 7 is a fragmentary view showing how the governor may be connected to control the fuel oil pump.

So far as the general structure of the engine is concerned, it may be said first that it may be of either the two-cycle or the four-cycle type; may have any type of exhaust mechanism, and may have any type of scavenging mechanism so far as the present invention is concerned. Further, it may have any desired number of cylinders and any type of fuel oil feeding pump which will supply to each injection valve at the proper time a measured quantity of fuel oil for each working cycle. In accordance with the practice in air injection Diesels this pump is driven from the engine in timed relation therewith and furnishes a measured charge to successive working spaces according to the firing order.

The simplest scheme is to use the same variable feed fuel pump customarily used with governor control in air injection engines. The control is disconnected from the governor so that the fuel oil feed is constant and is set at the desired low rate. This provides an engine which may readily be changed over for oil fuel with air injection by connecting the oil pump control connection to the governor, supplying air instead of gas to the compressor, and making any necessary adjustments required by the change of fuel.

Figure 1:
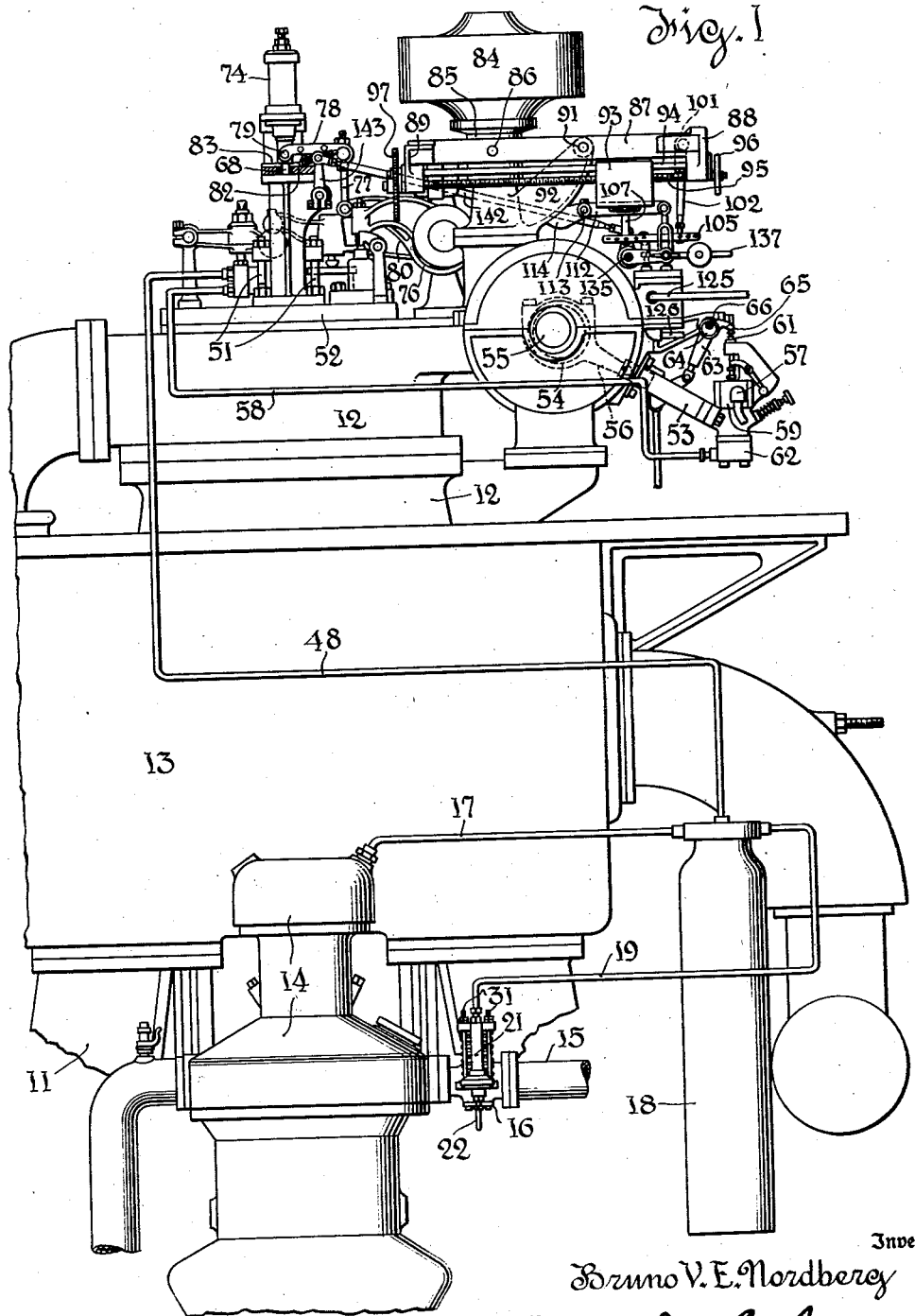
Fig. 1 is a fragmentary end elevation of a multiple cylinder Diesel engine of the gas injection type.

Referring first to Fig. 1, which shows a two cycle engine, a portion of the engine frame appears at 11, the upper portion of one working cylinder at 12, the cylinder of the scavenging air pump at 13 and the cylinder structure of the three-stage gas compressor at 14.

The scavenging air pump and the gas compressor are, as is usual, driven from the main crank shaft (not shown) and need not differ from the scavenging air pump and the stage compressor used for compressing the blast or injection air in ordinary air-injection Diesel engines, except in minor respects.

In compressing combustible gas the intercoolers customarily used in the blast air compressors, may be dispensed with, though their presence does no harm. In operating on manufactured gas or other relatively lean gas as contradistinguished from natural gas, the blast compressor should have somewhat greater capacity than is needed for blast air.

For the above reasons the engine illustrated follows air injection Diesel engine practices, and in fact is a commercial air injection Diesel engine with minor modifications to adapt it to gas operation. It is readily convertible to operation on the air injection principle using oil as the sole fuel. If the blast compressor then has excess capacity, this can be reduced by controlling its intake, as is described in connection with gas operation hereinafter.

The intake for gas is indicated at 15 and the intake regulator valve is generally indicated on Fig. 1 at 16, the numeral being applied to the body of the valve. The blast compressor, indicated generally by the numeral 14, discharges through pipe 17 to the blast "bottle" 18. The pressure in the bottle 18 is communicated to a portion of the intake regulator valve 16, which so controls the action of compressor 14 as to ensure maintenance of substantially constant pressure in the blast bottle 18.

The regulator 16 is illustrated in detail on a larger scale in Fig. 6. In this figure the pipe 19 is shown connected to a surge chamber or reservoir 21, partially filled with oil. From the lower end of this chamber a pipe 22 conducts the oil to the lower end of an adjacent cylinder 23 in which it acts against the lower end of piston 24. The upper end of piston 24 is in thrust engagement with a cup-like thrust member 25 which is encircled by a compression spring 26 acting downwardly on the flange 27 at the lower end of member 25. The upper end of spring 26 reacts against a spring seat 28 which is adjustable by means of the nuts 29 threaded on the tension rods 31.

Thrust member 25 engages thrust roller 32 on lever 33. This is pivoted at 34 to the swinging fulcrum-link 35, and at 36 to the valve stem 37. The body 16 of the valve has upper and lower bonnets 38 and 39 in which stem 37 is guided, and a double seat 41, 42 for the double beat regulating valve 43. The construction is such that the valve is approximately balanced, and any equivalent arrangement which will at least approximate the result may be substituted.

The stem 37 is made in two parts threaded together as indicated at 44, so as to be adjustable in length, and carries an adjustable spring seat 45. Between this seat 45 and bonnet 38 is a compression spring 46 which serves to hold roller 32 against member 25. The adjustment at 44 permits ready adjustment of the maximum opening of the valve. The adjustment of spring 26 gives control (within necessary limits) of the closing characteristics of valve 43. Grease cups are shown at 47.

As pressure in bottle 18 arises, piston 24 causes gradual closing movement of valve 43. Since this valve controls the compressor intake, the gas delivered by the compressor is regulated according to demand as indicated by pressure variations in bottle 18. Valve 43 is given tapered contours to secure the desired gradually variable throttling of the intake.

Figure 3:
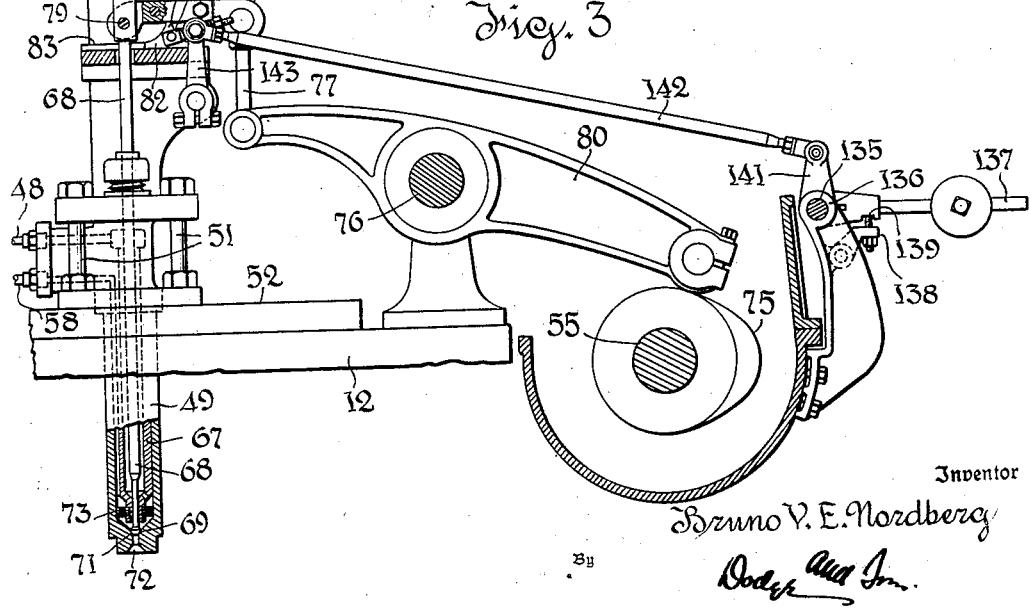
Fig. 3 is a section on the line 3—3 of Fig. 2.

From the blast bottle 18 is a pipe 48 which leads to the fuel injection valve 49 (see Figs. 1 and 3). This valve is bolted at 51 to the cylinder head 52 and projects through the cylinder head and terminates in the working space into which it discharges oil and gas. There is one of these valves for each working space in the engine and each is connected with the bottle 18.

There is also, for each working space in the engine, an oil pump whose cylinder appears at 53, and whose plunger is driven by an eccentric 54 on the cam shaft 55 of the engine (see Fig. 1) through eccentric strap 56. The cam shaft 55 is driven from the engine crank shaft as usual. In a two stroke cycle engine the cam shaft turns at crank shaft speed, and in a four stroke cycle engine at half crank shaft speed, as is well understood. The supply line for fuel oil enters the pump at 57 and the pump delivers through the pipe 58 to the fuel injection valve 49.

In a Diesel engine in which the fuel oil is merely an igniting fuel for gas, the pumps 53 can be simple constant feed pumps, but in the drawings is illustrated a type of variable feed pump heretofore used under governor control in conventional air injection Diesel engines. In Fig. 1, 59 is the inlet valve chamber and 61 the inlet valve stem. The discharge valve chamber is at 62. A rocker arm 63 is driven from the pump plunger and swings on eccentric 64. Arm 63 carries a nose 65 which engages inlet valve stem 61 to hold the inlet valve open during a part of the discharge stroke of the fuel pump. The eccentric 64 is mounted on shaft 66 so that it is possible to vary the quantity of oil discharged at each pump stroke, by turning the shaft 66 and thus varying the portion of the discharge stroke in which the pump inlet valve is held open. In conventional air injection Diesel engines, the governor is connected to rotate shaft 66. In the present arrangement the governor is not so connected. The shaft 66 is set to give the desired fuel oil feed rate and remains fixed in such setting while the engine operates. When the engine is shut down it can be turned manually so as to keep the suction valve open continuously for priming purposes or to cut off all fuel.

The fuel injection valve 49 is best shown in Fig. 3 and conforms generally to known design. Within the body is a sleeve 67 through which the stem 68 of the needle valve 69 works. The needle valve 69 has a seat 71 close to the discharge nozzle 72. Surrounding sleeve 67 at its reduced lower end are a plurality of perforated dispersing disks 73 which receive the oil and retain it in dispersed condition ready for the action of the gas blast.

The fuel oil supplied by pump 53 flows through pipe 58 to the annular space between the body of valve 49 and sleeve 67 where it collects on disks 73. The bottle 18 is always connected with the space within sleeve 67 by way of pipe 48. When needle valve 69 lifts, the gas under pressure from bottle 18, picks up the charge of oil from disks 73 and sprays it through nozzle 72 into the highly compressed air then in the working space. The oil ignites, spontaneously igniting the gas and the two burn together, producing a true Diesel cycle. In some cases the gas probably also spontaneously ignites, but under certain conditions such ignition of the gas cannot be relied upon.

As is usual, the needle valve 69 is urged to its seat 71 by a coil compression spring. This is housed in the casing 74. The valve is moved in an opening direction by a cam 75 on cam-shaft 55. The cam acts through a rocker arm 80 pivoted at 76, and connected through link 77 with a second rock lever 78 which is connected at 79 with valve stem 68.

The rock lever 78 is mounted on a shifting fulcrum which acts to vary the lift of the valve 69. This fulcrum takes the form of a knife edge 81 formed on a sliding block 82. The path of the block 82, defined by the guideway 83, is parallel with the straight lower edge of the lever 78 when the valve 69 is closed. It follows that the shifting of the block will not move the valve if the valve is closed. Consequently, shifting of the block does not change the time in the cycle at which the valve opens or closes, but as the block moves away from the valve stem the height of lift of the valve increases. Increased lift implies wider opening and greater flow of gas to carry an increase in load or correct for a loss in engine speed.

The block 82 is governor-controlled, and, because it requires considerable force to shift the block, a servo-motor is preferably included as a part of the governor.

Figure 2:
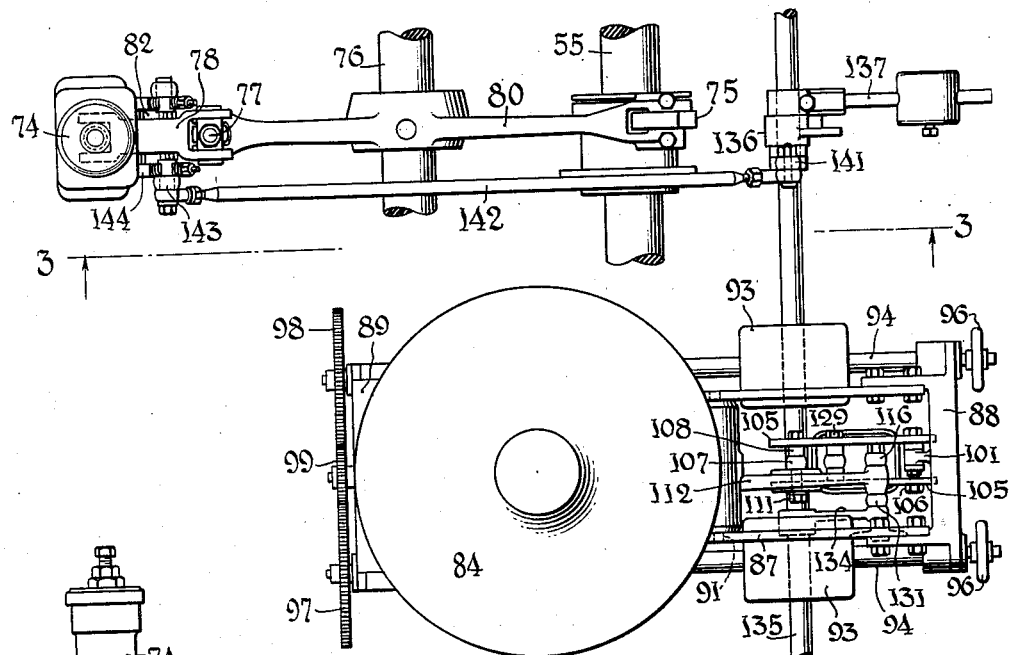
Fig. 2 is a plan view of the governor and gas control mechanism.

The governor mechanism is shown generally in Fig. 1 and in detail in Figs. 2 to 4 inclusive.

The casing of an ordinary centrifugal or flyball governor appears at 84 and the usual collar which rises as engine speed increases, appears at 85. The collar 85 has the usual peripheral groove (not shown) which is engaged by pins 86 on two arms 87 between which the collar 85 turns. The arms 87 are rigidly connected at their ends by two cross members 88 and 89, forming a single rectangular yoke or frame which is pivoted at 91 on the supporting bracket 92. The bracket 92 is integral with the governor frame or housing. The governor is driven from the cam shaft 55 by any suitable means such as skew-gears (not shown).

The governor is adjustably loaded by weights 93 which are shiftable in unison relatively to the fulcrum 91. To effect this the weights are suspended from rods 94 fixed at their ends in the cross members 88 and 89, and are engaged by threads on the rods 95, which rods are swiveled at their ends in the cross members 88 and 89. The rods may be turned by hand wheels 96 and are constrained to turn in unison by the gears 97, 98 and 99.

A lug 101 on cross member 88 is connected by link 102 with floating lever which controls the valve mechanism of the servo-motor which will now be described with particular reference to Figs. 4 and 5.

The link 102 ends in a transverse bearing sleeve 104 which lies between two parallel lever arms 105 and is hinged thereto by journal bolts 106. The opposite ends of the arms 105 are supported by a suspender link 107 which has a bearing sleeve 108 lying between the arms 105 and hinged thereto by a journal bolt 109. The arms 105 are formed with a plurality of holes to receive the journal bolts 106 and 109 so that the effective lever arms may be varied. The upper end of the suspender link 107 is hinged by a journal bolt 111 to the lever 112, which in turn is pivoted at 113 on a bracket 114 carried by bracket 92. The journal bolt 111 is received in a longitudinal slot 115 in lever 112, so that it is adjustable toward and from pivot 113.

The outer end of lever 112 is connected by link 116 with the end of piston rod 117 of the servo-motor. The piston rod 117 is connected with piston 118 which reciprocates in double-acting oil pressure motor cylinder 119. This cylinder has combined inlet and exhaust ports 121 and 122 at each end, and these ports communicate with the end portions of a chamber 123 in which a balanced piston valve 124 reciprocates. The piston valve 124 is a combined admission and exhaust valve, having admission at the middle and exhaust at the ends, and is designed with zero lap. Thus in mid-position it just blanks both ports 121 and 122, and if shifted slightly in either direction from mid-position connects either of said ports selectively with supply and the other with exhaust.

The supply connection for oil or other suitable liquid under pressure, appears at 125 in Fig. 5 and leads to the middle portion of chamber 123. Oil may be supplied under pressure by the lubricating oil pump, or other suitable source. The discharge connection appears at 126 and leads from the lower end of chamber 123. There are however through ports 127 in the piston valve 124 which connect the upper and lower ends of chamber 123 so discharge connection 126 serves both ends.

Valve 124 is actuated by a stem 128 which is pinned at 129 to floating lever arms 105.

The free end of arm 112 carries a pendant link 131 which is longitudinally slotted at 132 to receive pin 133 at the end of arm 134. The arm 134 is fixed on shaft 135 which is rotatable in bearings, one of which appears at 136, and is urged in a clockwise direction (as viewed in the drawings) by weighted arm 137. Thus pin 133 is normally held at the lower end of slot 132 so that shaft 135 rotates as the governor responds to speed variations. For starting (to prevent excessive initial supply of gas to the engine) the arm 137 may be lifted and latched in its upward position by hinged arm 138 which enters a shallow retaining notch 139 in arm 137 (see Fig. 3). The slot 132 permits this motion. When the engine starts and the governor affects shaft 135 the arm 138 drops to an inactive position by gravity.

The shaft 135 carries an arm 141 which is connected by a link 142 to a radius link 143 and to a drag link 144 which last is connected to the block 82.

As the engine operates the compressor 13 will furnish scavenging air and the stage compressor 14 will furnish highly compressed combustible gas for oil injection and fuel purposes. The compressed combustible gas is stored for use in bottle 18 and the regulator 16 functions as described to maintain the gas pressure in the bottle substantially constant.

Each oil pump 53 furnishes the corresponding fuel injection valve 49 a measured charge of oil for each working cycle, all of each charge of oil preferably entering the injection valve before the needle valve 69 starts to lift. The cams 75 operate to lift the corresponding needle valves just as the pistons in the working spaces served by the respective valves approach their dead points.

The height of lift of the needle valve, and consequently the quantity of combustible gas which enters the working space during a working stroke, depends on the position of the fulcrum 81, as already explained. Such position is controlled by the governor acting through the servo-motor.

The action of the governor may be readily traced. Assume engine speed increases. Collar 84 rises and levers 87 shift clockwise lowering the right ends of levers 105 and hence lowering valve 124 connected to these links near their middles. This causes piston 118 to move upward raising lever 112 and hence the left ends of levers 105

105 until valve 124 once more laps ports 121 and 122.

The upward motion of lever 112 is imparted to arm 134 so that shaft 135 turns counterclockwise, shifting block 82 with fulcrum 81 to the left and reducing the lift of the needle valve 69 to reduce the quantity of combustible gas injected.

If for any reason it is desired that the governor shall control the quantity of fuel oil fed, shafts 135 and 66 may be connected as illustrated in Fig. 7, shaft 66 being then free to turn. To secure the desired result a link 151 connects an arm 152 fixed on shaft 135 with arm 153 fixed on shaft 66. When shaft 135 turns counterclockwise to reduce the lift of the gas valve, shaft 66 turns clockwise to lower eccentric 64 and cause nose 65 to hold the inlet valve of the fuel oil pump open during a larger portion of the discharge stroke of the fuel pump.

While it is feasible to regulate both oil and gas, regulation of gas alone is preferred, as simpler. Fig. 7 suggests also how the engine may be converted to air injection operation. In such case link 142 may or may not be removed according as control of the quantity of air is or is not to be dispensed with. If removed, block 82 must be fixed in position.

An important feature of the invention is that the engine is readily convertible from gas injection operation, for which it is primarily intended, to air injection operation. This is a desirable feature in natural gas fields, because failure of or increased cost of gas, may make oil operation necessary.

What is claimed is,—

1. In a Diesel engine, the combination of a cylinder having a working space; a fuel injection nozzle having a valve controlling flow through the nozzle to the working space; means for actuating said valve; regulating means for varying the amount said valve is opened by said means; means for supplying charges of fuel oil to said nozzle for successive working strokes; and means for supplying combustible gas under pressure to said nozzle.

2. In a Diesel engine, the combination of a cylinder having a working space; a fuel injection nozzle having a valve controlling flow through the nozzle to the working space; means for actuating said valve, including a rocking lever and a shiftable fulcrum therefor, the parts being so arranged that shifting of the fulcrum varies the amount of opening movement of said valve; regulating means controlling the position of said fulcrum; means for supplying charges of fuel oil to said nozzle for successive working strokes; and means for supplying combustible gas under pressure to said nozzle.

3. The combination of claim 2, in which the regulating means includes a speed responsive governor, and a servo-motor having a follow-up valve mechanism, the governor controlling the follow-up valve mechanism, and the motor being operatively connected with the fulcrum to shift the same.

4. In a Diesel engine, the combination of a cylinder having a working space; a fuel injection nozzle having a needle valve controlling flow through the nozzle to the working space; means for lifting said valve from its seat including a fulcrum shiftable toward and from the needle valve and a lever slidably fulcrumed thereon and operatively connected with said needle valve, the path of the fulcrum being coincident with that surface on the lever engaged by the fulcrum when the needle valve is closed; regulating means controlling the shifting of said fulcrum; means for supplying charges of fuel oil to said nozzle for successive working strokes; and means for supplying, to said nozzle, combustible gas under pressure.

5. The combination of claim 4, in which the regulating means includes a speed responsive governor, and a servo-motor having a follow-up valve mechanism, the governor controlling the follow-up valve mechanism, and the motor being operatively connected with the fulcrum to shift the same.

6. In a Diesel engine, the combination of a cylinder having a working space; a fuel injection nozzle having a needle valve controlling flow through the nozzle to the working space; actuating means for opening and closing said valve at definite points in the working cycle; means associated with said actuating means and modifying the action thereof to vary the degree of opening movement; means for supplying to the nozzle a measured charge of fuel oil for each working cycle; and means for supplying combustible gas under pressure to said nozzle.

7. In a Diesel engine, the combination of a cylinder having a working space; a fuel injection nozzle having a variable lift needle valve controlling flow through the nozzle to the working space; actuating means for opening and closing said needle valve at definite points in the working stroke; means for supplying combustible gas under pressure to said nozzle; adjustable means for furnishing measured charges of fuel oil to said nozzle; and controlling means for concurrently varying the lift of said needle valve and the quantity of the measured charge of oil.

8. In a Diesel engine, the combination of a cylinder having a working space; a fuel injection nozzle having a variable lift needle valve controlling flow through the nozzle to the working space; actuating means for opening and closing said needle valve at definite points in the working stroke; means for supplying combustible gas under substantially uniform pressure to said nozzle; adjustable means for furnishing measured charges of fuel oil to said nozzle; and controlling means for concurrently varying the lift of said needle valve and the quantity of the measured charge of oil.

9. In a Diesel engine, the combination of a cylinder having a working space; a fuel injection nozzle having a valve controlling flow through the nozzle to the working space; actuating means for said valve, capable of opening the same to varying extents in timed relation with the operation of the engine; adjustable means for furnishing variable charges of fuel oil to said nozzle; means for supplying combustible gas under pressure to said nozzle; and a single controlling means for varying the opening movement of said valve and for varying the quantity of oil fed in said charges.

10. In a Diesel engine, the combination of a cylinder having a working space; a fuel injection nozzle having a valve controlling flow through the nozzle to the working space; actuating means for said valve, capable of opening the same to varying extents in timed relation with the operation of the engine; adjustable means for furnishing variable charges of fuel oil to said nozzle; means for supplying combustible gas under pressure to said nozzle; and a speed responsive governor controlling the extent of opening of said valve, and the quantity of fuel oil in said charges.

11. The combination of a Diesel engine having means for injecting fuel oil into the working space by means of a combustible gas under pressure; a receiver for storing such gas; a stage compressor for delivering combustible gas to said receiver; and means responsive to pressure in said receiver for regulating the supply of gas to the first stage of said compressor.

12. The combination of a Diesel engine having means for injecting fuel oil into the working space by means of a combustible gas under pressure; means for controlling said engine by varying the quantity of gas used for such oil injection; a receiver for storing such gas; a stage compressor for delivering combustible gas to said receiver; and means responsive to pressure in said receiver for regulating the supply of gas to the first stage of said compressor.

13. In a convertible Diesel engine, the combination of a cylinder; an adjustable fuel oil injecting valve mechanism therefor, capable of operation alternatively by compressed air or compressed combustible gas; a regulable compressor capable of furnishing either air or combustible gas in suitable quantity to said injecting mechanism; an adjustable oil feeding device for feeding measured charges of fuel oil to said injecting valve mechanisms; a governor; and releasable connections by which selectively the governor may regulate the quantity of gas used during combustible gas injection, and the quantity of oil used during air injection.

14. The combination defined in claim 13 in which the regulable compressor has a maximum capacity in excess of that required for air injection, and automatic means are provided to vary the capacity in response to the demand.

15. The combination with a Diesel engine having a cylinder of a fuel injection nozzle; a needle valve controlling flow through the same to the cylinder; means for supplying to the nozzle a measured charge of fuel oil and combustible gas under pressure, the gas serving to inject the oil when the needle valve is lifted; means for lifting the needle valve in timed relation with the operation of the engine; and governing means for varying the height of lift of the needle valve.

16. The combination with a Diesel engine having a cylinder of a fuel injection nozzle; a needle valve controlling flow through the same to the cylinder; means for supplying to the nozzle a uniform measured charge of fuel oil and combustible gas under pressure, the gas serving to inject the oil when the needle valve is lifted; means for lifting the needle valve in timed relation with the operation of the engine; and governing means for varying the height of lift of the needle valve.

17. The combination with a Diesel engine having a cylinder of a fuel injection nozzle; a needle valve controlling flow through the same to the cylinder; means for supplying to the nozzle a measured charge of fuel oil and combustible gas under pressure, the gas serving to inject the oil when the needle valve is lifted; means for lifting the needle valve in timed relation with the operation of the engine; and governing means for varying the quantity of gas flowing through the needle valve during each lift.

BRUNO V. E. NORDBERG.